Patented Dec. 22, 1925.

1,566,798

UNITED STATES PATENT OFFICE.

CHARLES J. KUNTZ, OF GLENDALE, NEW YORK, AND JOSEPH SIMONS, OF EAST ORANGE, NEW JERSEY.

PROCESS OF WATERPROOFING STRAW HATS AND THE LIKE AND PRODUCT OF THE SAME.

No Drawing. Application filed January 3, 1925. Serial No. 372.

*To all whom it may concern:*

Be it known that we, CHARLES J. KUNTZ and JOSEPH SIMONS, citizens of the United States of America, residing at Glendale, Long Island, county of Queens, State of New York, and East Orange, county of Essex, State of New Jersey, respectively, have invented certain new and useful Improvements in Processes of Waterproofing Straw Hats and the like and Product of the Same, of which the following is a specification.

This invention relates to a novel method of water-proofing body hats and straw hats, and the product of the same.

Pursuant to our invention, the material of body hats and of hats formed of sewed straw braid is coated with a minute film of nitrocellulose or equivalent material, which is impervious to and resistant toward rain and moisture and also with respect to dust, dirt and other forms of soiling, and which permits the hat to be washed with water or otherwise without substantially destroying the color or texture of the material, or the shape of the hat.

Pursuant to our invention, the body hat or straw hat is subjected to a spray of the coating material dissolved in a suitable vaporizing solvent and an adhesive medium and other ingredient of such nature whereby the particles of the spray are of most finely divided nature and the residue resulting from the evaporation upon deposit on the surface of the hat possesses the property of forming with the glue usually applied by dipping or otherwise to the surface of the hat and with the material of the hat an adhesive for binding the minute particles of nitrocellulose or equivalent to one another to form a substantially continuous coating and including the undulating surfaces of the straw or like material of the hat.

By such spraying procedure, the thickness of the coating is reduced to a film of such minute dimension that notwithstanding the slightly creamy color of the nitrocellulose or equivalent material per se, the residue resulting pursuant to our process is substantially clear and does not modify the desider tone of color of the straw or other material of the hat.

Our process may be carried out by means of any form of suitable spraying device, such as the so-called air-brush, which usually consists of a receptacle for containing the solution of the coating material, a pipe extending into the receptacle and provided with a suitable nozzle for the discharge of the spray, and piping connection with a source of compressed air leading into the interior of the receptacle for ejecting the spray and agitating the solution in the receptacle.

As an example of a coating mixture, we employ nitrocellulose of any suitable form such as gun cotton. The gun cotton is dissolved in one gallon of amyl acetate, and preferably in the proportion of six ounces of gun cotton to one gallon of amyl acetate.

As a suitable ingredient for rendering the gun cotton or other form of nitrocellulose adhesive and to combine with the usual form of glue employed in the ordinary method of treating body hats and sewed straw braid hats and with the straw, we employ gum sandarach and gum elemi, each or both of which may be dissolved in the proportion of two pounds of the gum to one gallon of denatured alcohol.

The aforesaid ingredients are intermixed with one another preferably in the proportion of eight parts of the solution of gun cotton in amyl acetate to one and one half parts of the solution of sandarach in denatured alcohol to one-half part of the solution of gum elemi in denatured alcohol.

As a thinner, we prefer amyl acetate and fusel oil, which may be added in the proportion of three parts of amyl acetate and one part of fusel oil to the mixture resulting from the aforesaid proportional mixture of gun cotton, gum sandarach and gum elemi.

The spraying is performed in any suitable manner, but preferably within a suitable enclosure and preferably maintained at a uniform temperature. The coating may be applied by spraying first the upper surface of the hat, as by placing the hat or hats upon a suitable support and thereafter spraying the under surface of the brim of the hat, and, if desired, also the inner surfaces of the crown of the hat.

In lieu of nitrocellulose, acetyl cellulose or like water-resistant cellulose product or equivalent may be employed.

From our discoveries, we have observed that the deposited coating resulting from the spray may be readily controlled in thickness and to effectively cover the complete undulating surfaces of the straw or straw braid and including the interstices. The resulting residue at the instant of deposit while still embodying a small content of the solvent and of the thinner, forms a combined adhesive with the glue previously applied to the material of the hat and secures a highly effective adhesion with the straw or other material of the hat.

The resulting dried residue forms a pliable coating which maintains its adhesion with the straw and does not peel or chip off. The residue is also free from any "stickiness" or "tacky" feeling to the hand and does not gather dust or dirt.

In the use of hats produced pursuant to our invention, rain, mist or other atmospheric moisture is readily shed by the coating and without causing discoloration or peeling off of the coating. Whenever it is desired to remove dust or other dirt from the hat, the hat may be scoured with water and soap or other ablutant if desired. The shape of the hat is also preserved when subjected to rain or washing.

Hats coated pursuant to our invention possess the same color and appearance as hats bearing solely the usual glue. Our invention enables the hat to be washed to remove dirt or other soiling as often as may be desired.

Our invention is advantageous in application on formed body hats and sewed straw braid hats and is also applicable to the straw and straw braid and other material previous to the weaving or shaping of the same into the formed hat, and may be applied if desired by dipping the material of the hat or the formed hat into a bath containing the aforesaid ingredients.

Whereas we have described our invention by reference to specific forms thereof, it will be understood that many changes and modifications may be made without departing from the spirit of the invention.

We claim:—

1. A straw hat having a waterproof coating comprising nitrocellulose and sandarach gum forming with nitrocellulose a pliable solid adhesive with the material of the hat.

2. A straw hat having a waterproof coating comprising nitrocellulose and gum sandarach and gum elemi.

3. A straw hat having a waterproof coating embodying a water-resistant cellulose product combined with sandarach gum forming when dried a pliable adherent with the sizing of the hat.

In testimony whereof we have signed this specification this 24th day of December 1924.

CHARLES J. KUNTZ.
JOSEPH SIMONS.